United States Patent
Rizvi et al.

(10) Patent No.: US 6,623,781 B2
(45) Date of Patent: Sep. 23, 2003

(54) MICROFILTRATION OF SKIM MILK FOR CHEESE MAKING AND WHEY PROTEINS

(75) Inventors: Syed S. H. Rizvi, Ithaca, NY (US); Randall L. Brandsma, Green Bay, WI (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 10/255,085

(22) Filed: Sep. 26, 2002

(65) Prior Publication Data

US 2003/0077357 A1 Apr. 24, 2003

Related U.S. Application Data

(63) Continuation-in-part of application No. 09/593,770, filed on Jun. 14, 2000, now Pat. No. 6,485,762.
(60) Provisional application No. 60/145,271, filed on Jul. 26, 1999.

(51) Int. Cl.$^7$ ............................... A23L 2/00; A23C 9/00
(52) U.S. Cl. ..................... 426/599; 426/41; 426/491; 426/492; 426/580; 426/583
(58) Field of Search .................... 426/34, 599, 656, 426/36, 38, 39, 40, 41, 478, 490, 491, 492, 42, 43, 580, 583

(56) References Cited

U.S. PATENT DOCUMENTS 5,153,019 A * 10/1992 Hammond .................. 426/590
6,485,762 B1   11/2002 Rizvi et al. .................... 426/34

OTHER PUBLICATIONS

Brandsma, R. L. and Rizvi, S. S. H., J. Animal Science 76, Suppl. 1/J. Dairy Sci. 81, Suppl. 1, p. 15, Abstract 55 (1998) from ADSA–ASAS joint meeting Jul. 28–31, 1998.
Brandsma, R. L. and Rizvi, S. S. H., J. Dairy Sci. 82, Suppl. 1, p. 14, Abstract D56 (1999) from ADSA 94$^{TH}$ Annual Meeting Jun. 20–23, 1999.
Brandsma, R. L. and Rizvi, S. S. H., J. Dairy Sci.82, 2063–2069 (1999).
St.–Gelais, E., et al., Milchwissenschaft 50(11), 614–619 (1995).
Britten, M., et al., Lait 76, 255–265 (1996).
Covacevich, H. R., et al., J. Dairy Sci. 61, 701–709 (1978).
Fauquant, J., et al., Tech. Laitiere 1028, 21–23 (1988).
Bull. No. 320, Int. Dairy Fed., Brussels, Belgium, pp 8–40 (1997).
Maubois, J.–L., et al., XX Int. Dairy Congr., Paris, France, Int. Dairy Fed., Brussels, Belgium, pp. 792–793 (1978).
Mistry, V. V., et al., in Cheese:Chemistry, Physics and Microbioloty, P.F. Fox, ed., vol. 1, 2d edition, pp 493–521 (1993), Chapman and Hall, London.
Pedersen, P. J., in New Applications of Membrane Processes, Int. Dairy Fed., Brussels, Belgium, pp 30–50 (1991).
Pierre, A., et al., Lait 72, 461–474 (1992).
St.–Gelais, D., et al., J. Dairy Sci. 75, 1167–1172 (1992).
Turgeon, S., J. Dairy Sci. (Suppl. 1) 128, Abstract D102 (1995).

* cited by examiner

*Primary Examiner*—Leslie Wong

(57) ABSTRACT

Microfiltration of skim milk is carried out in combination with in-process pH reduction to provide a retentate useful for cheese making which is concentrated to a concentration factor of 7× to 12× and contains a ratio of calcium to total protein which is desired for the cheese, and a permeate which contains 40 to 80% of the whey protein of the skim milk being processed which is highly functional and typically contains little or no casein. Composition containing highly functional whey protein with no measurable fat or casein and no glycomacropeptides, rennet or starter cultures can be obtained; fruit beverages are disclosed which contain this composition.

10 Claims, 3 Drawing Sheets

MICROFILTRATION OF SKIM MILK FOR CHEESE MAKING AND WHEY PROTEINS

CROSS-REFERENCE TO RELATED APPLICATIONS

This application is a continuation-in-part of U.S. application Ser. No. 09/593,770, filed Jun. 14, 2000 now U.S. Pat. No. 6,485,762, which claims the benefit of U.S. Provisional Application No. 60/145,271, filed Jul. 26, 1999.

TECHNICAL FIELD

This invention in one aspect is directed to a process involving microfiltration of skim milk, providing one product which is useful in cheese making and another product which is useful as a source of whey protein. This invention in another aspect is directed to preparing cheese from microfiltration retentate. This invention in another aspect is directed to composition obtained from skim milk which is useful as a source of whey protein. This invention in another aspect is directed to a fruit beverage comprising whey protein containing composition obtained from skim milk.

BACKGROUND OF THE INVENTION

In a conventional cheese making process, dilute whey byproduct obtained after coagulation may be subjected to ultrafiltration to concentrate whey proteins (also known and referred to as serum proteins) to produce whey protein concentrate or whey protein isolate. This produces highly variable whey protein products in terms of composition and functionality, leading food manufacturers to use other protein sources.

It is known that microfiltration of skim milk produces a permeate containing significant amounts of native-state whey protein but the only use suggested for the retentate has been the supplementation of normal milk to slightly higher protein levels. This combination of uses does not provide economic viability.

SUMMARY OF THE INVENTION

It was a goal of the research leading to the invention herein to provide an economically viable process for cheese making from skim milk which also provides a consistent composition which is sterile and contains a large percentage of the whey protein from the skim milk in highly functional (non-denatured) state. This goal has been accomplished herein by subjecting skim milk to microfiltration to provide a retentate of higher concentration factor than has been described in prior art coupled with in-process acidification to reduce calcium content in the retentate to provide a ratio of calcium to total protein in the retentate which is desired for a cheese product whereby the retentate is useful for cheese making and a permeate is produced which is a good source of native-state whey protein and which has a composition that is not dependent on the kind of cheese being made.

In one aspect, denoted the first embodiment, the invention herein is directed at a process for obtaining from skim milk a concentrated milk product useful in cheese making and another product which is a source of whey protein, said process comprising subjecting skim milk to microfiltration and pH reduction during the microfiltration to provide a retentate which is the concentrated milk product and a permeate which is the product that is the source of whey protein. Typically, the microfiltration and pH reduction are carried out to provide a retentate which is concentrated to a concentration factor of 7× to 12× compared to the skim milk being processed and is depleted in whey protein and contains higher weight percentage of casein compared to the skim milk being processed and to provide a permeate which contains 40 to 80% of the whey protein of the skim milk being processed and typically no or little casein. The pH reduction is effected by adding acidulant and/or starter culture to the skim milk/retentate during microfiltration and is carried out to cause an increased amount of calcium to be in the permeate, and thus reduce the amount of calcium in the retentate and thus provide a ratio of calcium to total protein in the retentate which is desired for the variety of cheese to be made from the retentate. Preferably, the microfiltration is carried out using a membrane of 0.1 μm to 0.2 μm pore size and pH reduction is effected in a manner which minimizes membrane fouling. Very preferably, the microfiltration is carried out to provide a retentate which is concentrated to a concentration factor of 7× to 9× as compared to the skim milk being processed and pH is reduced to 6.0 by addition of glucono delta lactone and/or starter culture.

In another aspect, denoted the second embodiment, the invention herein is directed to a process for making Mozzarella cheese, e.g., low-moisture, part skim Mozzarella cheese, comprising the steps of: (a) preparing an admixture of retentate as described above and milkfat to obtain a protein: fat ratio within 15% of that in the final cheese; (b) forming a homogeneous cheesemilk from the admixture; (c) adding acidulant and/or starter culture to achieve suitable and typical acidity in the final cheese being made, of which the pH of Mozzarella including LMPS Mozzarella ranges from 5.0 to 5.7; (d) adding rennet to cause formation of a coagulum; (e) cubing the coagulum and heating and draining whey if drainable whey is present to produce cheese curd of 44 to 56% moisture content; and (f) forming the cheese curd into the final cheese.

In another aspect, denoted the third embodiment, the invention herein is directed to a composition obtained from skim milk where the composition contains whey protein in amounts of 40% to 80% of that of the skim milk where the whey protein has a denaturation enthalpy of at least 12.00 ΔH (J/g) and where the composition is sterile of microorganisms and contains less than 0.20% by weight fat on a dry basis and no measurable casein and no glycomacropeptides, rennet or starter culture.

In another aspect, denoted the fourth embodiment, the invention herein is directed at a fruit beverage comprising by weight 10 to 30% fruit juice concentrate, 5 to 8% sugar and 62 to 85% of composition of the third embodiment, having a pH ranging from 3.5 to 4.3.

As used herein, the term "microfiltration" is used to mean a class of filtration that typically uses membrane pore sizes ranging from 0.05 to 0.2 μm and pressures on the upstream side of the membrane ranging from 69 to 690 kPa.

As used herein, the term "retentate" is used to mean in relation to a microfiltration process that liquid product of skim milk microfiltration that is the concentrated skim milk feed and which contains all the components typically found in skim milk but with an increased solids mass percentage (as compared to the original skim milk) of casein, whey protein, fat, and minerals (ash), primarily being calcium, phosphorus, and magnesium.

As used herein, the term "permeate" is used to mean in relation to a microfiltration process that liquid product of skim milk microfiltration which contains only those skim milk components that are able to pass through the microfiltration membrane. Permeate from microfiltration of skim milk is typically composed of water, lactose, whey proteins, and minerals (ash), primarily being calcium, phosphorus, magnesium, sodium and potassium.

As used herein, the term "concentration factor" is used to mean a reduction in volume from the original volume of skim milk to a volume of (1 divided by the concentration factor) times the original volume.

The "total protein" referred to herein can be determined by multiplying total nitrogen determined by macro-Kjeldahl as described in AOACI Official Methods of Analysis, $16^{th}$ edition (1995) by a factor of 6.38.

As used herein, the term "acidulant" means any preformed acid or acidogen in liquid or solid form, that when added to skim milk, retentate, or retentate-based cheesemilk will produce $H_3O^+$ ions in the solution, thus causing a decrease in the pH of the skim milk, retentate or retentate-based cheesemilk.

BRIEF DESCRIPTION OF THE DRAWINGS

In FIG. 3, GDL means glucono-delta-lactone.

DETAILED DESCRIPTION OF THE INVENTION

Figure 1:
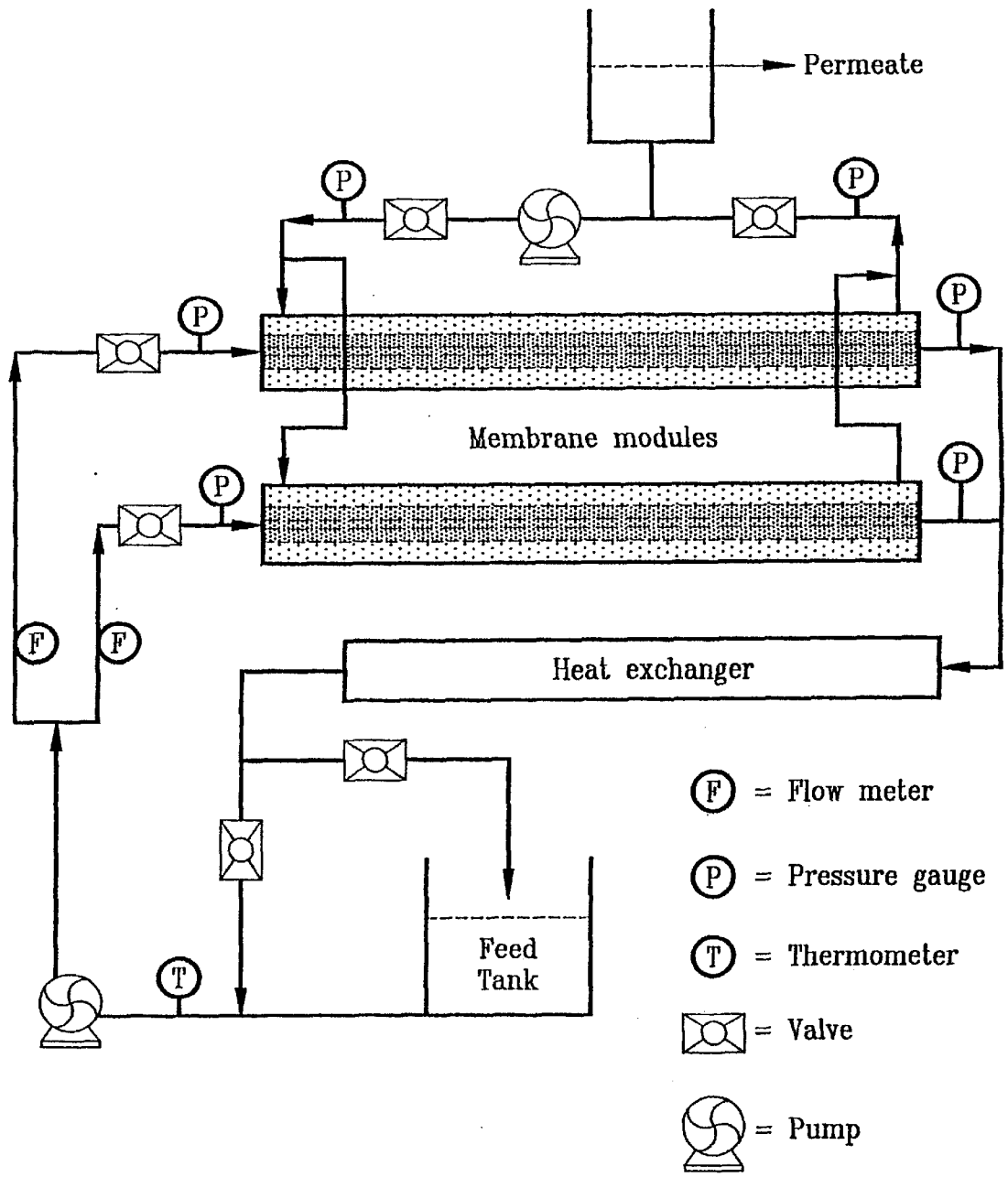
FIG. 1 is a schematic diagram of the microfiltration membrane system incorporating a uniform transmembrane pressure loop, used in Example I hereinafter.

We turn now to the first embodiment of the invention, that is the embodiment directed at a process for obtaining from skim milk a concentrated milk product useful in cheese making and another product which is a source of whey protein, said process comprising subjecting skim milk to microfiltration and pH reduction during the microfiltration to provide a retentate which is the concentrated milk product and a permeate which is the product that is the source of whey protein, where typically the microfiltration and pH reduction are carried out to provide a retentate which is concentrated to a concentration factor of 7× to 12× as compared to the skim milk being processed and is depleted in whey protein and contains higher weight percentage of casein compared to the skim milk being processed and to provide a permeate which contains 40 to 80% of the whey protein of the skim milk being processed and no or little casein.

Skim milk microfiltration is a protein selective process that normally retains all of the casein in the retentate and passes a major portion of the whey protein into the permeate.

The microfiltration is preferably carried out utilizing a uniform transmembrane pressure loop with retentate circulating in the loop containing a microfiltration membrane and the permeate passing through a microfiltration membrane leaving as one product stream and the retentate being obtained as the other product once all the permeate is recovered.

The microfiltration membrane pore size can range, for example, from 0.05 to 0.2 μm and preferably ranges from 0.1 μm to 0.2 μm and very preferably is 0.2 μm. Alumina-based ceramic membranes of 0.2 μm nominal pore diameter, useful for the microfiltration herein, are available from U.S. Filter Corp. (Warrendale, Pa.) under the trademark Membralox® P19-40.

The uniform transmembrane pressure can range, for example, from 30 to 400 kPa, and in the experiment of Example I was 262 kPa.

The pressure differential between the retentate inlet and retentate outlet of a membrane can range, for example, from 69 to 690 kPa, and in the experiment of Example I was 138 kPa.

The cross flow velocity can range, for example, from 3 to 10 m/s, and in the experiment of Example I was 7.5 m/s.

The feed to the system is skim milk and preferably is high temperature, short time pasteurized skim milk which for pasteurization has been heated to about 73° C. for at least 15 seconds.

The system is preferably maintained at 45 to 55° C., very preferably at 50° C., to maintain low skim milk viscosity, but without significant and detrimental heat-induced reactions between caseins and whey proteins.

As indicated above, the microfiltration is carried out to provide a retentate which is concentrated to a concentration factor (CF) of 7× to 12× as compared to the skim milk being processed. As indicated above, this means that the retentate is reduced in volume from the original volume (OV) of the skim milk to a volume of (1/CF) (OV), so there is a volume reduction ranging from about 86% (7×) to about 92% (12×). Preferably, the microfiltration is carried out to provide a retentate which is concentrated 7× to 9× as compared to the original volume of skim milk being processed or a volume reduction of about 86% to about 89% of the original volume of skim milk processed and in the experiment of Example I hereinafter microfiltration is carried out to provide a retentate which is concentrated 8× to 9× compared to the original volume of skim milk being processed or a volume reduction of about 87% to about 89% of the original volume of the skim milk being processed.

We turn now to the pH reduction which is carried out in-process. As indicated, this is effected by adding acidulant and/or starter culture to the skim milk/retentate being processed during the concentrating thereby to cause an increased amount of calcium to be in the permeate and thus reduce the amount of calcium in the retentate and providing a ratio of calcium to total protein in the retentate which is desired for the variety of cheese to be made from the retentate. The ratio of calcium/total protein or calcium/casein is herein computed as (percent calcium/total protein) times 100, or (percent calcium/casein) times 100. The pH reduction is essential because a lower retentate Ca to total protein ratio than is obtained by microfiltration at the normal pH of skim milk (pH of 6.6 to 6.7) is necessary to achieve a proper level of Ca in a cheese having good melting and/or stretching properties.

The Ca to total protein ratio can range, for example, from 2.3 to 3.7 and in the experiment of Example I was 2.53 and was obtained by reduction of retentate pH to 6.0 during microfiltration. Reductions of pH, for example, to a pH range of 5.8 to 6.4 are considered useful during the microfiltration process.

The reduction of retentate pH to 6.0 in Example I hereinafter reduced retentate calcium 20.1% but increased retentate whey protein content by 12.6% compared to no pH reduction (i.e., retentate pH of 6.6).

Figure 3:
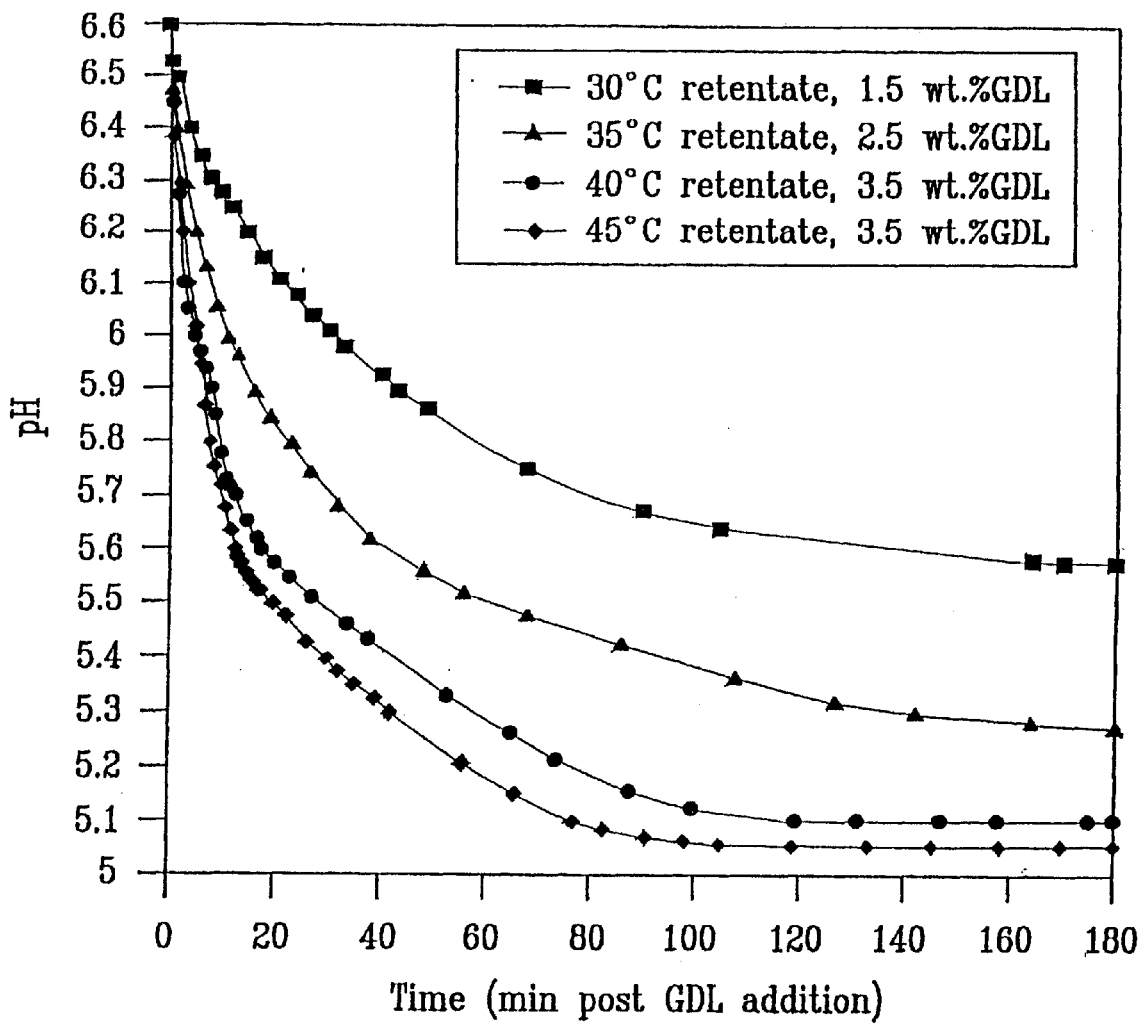
FIG. 3 is a graph of pH response curves for glucono-delta-lactone-induced acidification of pH 6.6 concentration factor 8–9 skim milk microfiltration retentate.

The acidulants used for retentate pH reduction can be those used in food preparation and include, for example, lactic acid, citric acid, hydrochloric acid, and glucono-delta-lactone, which hydrolyzes by a temperature-dependent process to form gluconic acid. FIG. 3 shows data on pH reduction with time at retentate temperatures of 30° C. to 45°

C. for glucono-delta-lactone-induced acidification of pH 6.6 concentration factor 8–9 skim milk microfiltration retentate; higher temperatures will accelerate acid development. Starter culture, which may be used as an alternative for or in combination with acidulant, naturally develops lactic acid in the skim milk/retentate being processed.

As indicated above, pH reduction is effected in a way to minimize membrane fouling. In explanation, when the retentate is at pH 6.0, caseins have a tendency to cause greater fouling of the microfiltration membrane. Thus, it is desirable for the final pH to be achieved only late in the microfiltration, so most of the permeate is already obtained. Thus, to minimize membrane fouling, the pH reduction should be gradual rather than all at the beginning of the microfiltration. To minimize membrane fouling, it has been found that when glucono-delta-lactone is the acidulant, it is preferably dissolved in 4° C. skim milk and added to circulating retentate via the feed tank shown in FIG. 1, with one-half the pH reduction being carried out between the start of the process and a concentration factor of 2× (CF2) with the remaining pH reduction taking place during concentration from CF2 to a concentration factor of 6× (CF6).

We turn now to the retentate product. It has been found to have no-off flavors or odors during or after the filtration process as compared to skim milk. It contains a higher solids mass percentage of casein and is depleted in whey protein as compared to the original skim milk and may be described as being casein-rich. In the experiment of Example I hereinafter, whey protein in the retentate product constituted 9 to 11% of true protein (that is total protein minus non-protein nitrogenous compounds). The presence of some whey protein in the retentate product is not considered a detriment because it provides increased yield when the retentate is used for cheese making and development of better cheese meltability (versus cheese having retention of all whey protein) and makes the retentate product an especially good starting material for manufacture of Mozzarella cheese.

The retentate product is readily processed into cheese by admixing milkfat (e.g., butteroil or cream including plastic, i.e., high fat content, cream) to approximate the protein: fat ratio desired in the cheese being made, forming a homogeneous cheesemilk, adding acidulant (e.g., glucono-delta-lactone) and/or starter culture to achieve suitable acidity in the final cheese, adding rennet to cause formulation of a coagulum, cubing the curd, heating and draining drainable whey and then forming the final cheese.

The same retentate is useful to produce a variety of cheeses, e.g., Mozzarella, Cheddar or the young cheese component of a processed cheese mixture. The retentate is especially useful for the production of semi-hard to hard cheeses. A difference in the making of the different cheese varieties is the amount of fat admixed with the retentate.

One embodiment of the invention herein is directed to a process for preparing Mozzarella cheese and is described in some detail below.

In the making of Mozzarella cheese, a protein to fat ratio ranging, for example, from 0.9 to 3.2 is useful and in Example II herein a protein: fat ratio of 0.94 (casein:fat ratio of 0.84) was used.

The retentate product allows for the manufacture of cheese with normal calcium levels and with significantly less whey protein as compared to fill concentration ultrafiltration cheese and is therefore more suitable for manufacture of semi-hard cheeses than ultrafiltration retentates.

Cheese making using the retentate product requires a significantly lesser amount of rennet than is obtained in normal cheese making. In the experiment of Example II, 93% less rennet was used than normally would be used to produce the same yield of cheese in conventional cheese making. This is largely because in conventional cheese making, 90% to 95% of the rennet is lost when the whey is separated.

Thus, the retentates herein are useful for the manufacture of a number of cheese varieties with increased yield because of the inclusion of some whey protein and significantly decreased need for rennet.

We turn now to the permeate product. It is characterized by being sterile of microorganisms, having constant composition (does not vary with the variety of cheese being made from the retentate since the same retentate composition is suitable for making several varieties of cheeses), and contains commercially extractable amounts of highly functional (non-denatured, native-state, therefore retaining natural biochemical activity) whey (serum) proteins. It is similar to whey from conventional cheese making in lactose, total protein and ash content but unlike cheese whey normally does not contain measurable fat or casein and does not contain glycomacropeptides, rennet or starter culture. The lack of fat is positive especially for enhancement of the functional properties of whey protein concentrate or whey protein isolate obtained therefrom. The sterility and purity characteristics cause it to be free of typical "whey flavor" generally associated with whey obtained incident to commercial cheese production. It contains immunoglobulins, lactoferrins, lactoperoxidase, $\alpha$-lactalbumin and $\beta$-lactoglobulin, all of which can be obtained therefrom.

We turn now to uses for the permeate.

The permeate is readily converted into nutritious soft drinks, both carbonated and non-carbonated, e.g., by formulating a composition containing by weight 6 to 10% permeate solids, 5 to 15% sugar, 1 to 2% gums/stabilizers and flavorants, colorants, and citric acid/ascorbic acid as needed. For beverage formulation, the permeate can be formulated with juices, such as orange, apple and grape juices. The permeate can be treated with enzymes to hydrolyze lactose to prevent complications associated with milk sugar consumption in lactose intolerant individuals. The permeate can be spray dried or freeze dried to provide a dry source of whey protein.

Whey (serum) proteins can be obtained from the permeate. For example, $\beta$-lactoglobulin can be purified from the permeate by affinity adsorption utilizing chitosan (powdered sea shells) as the adsorption medium that preferentially binds $\beta$-lactoglobulin, and together with alternating acidic and basic conditions; $\beta$-lactoglobulin has been recovered in up to 85% purity in this way.

Uses for purified whey proteins include nutritional fluids for elderly or immuno-compromised individuals, infant formula ($\alpha$-lactalbumin), molecular biology (cell growth factors), nutraceuticals, and highly-functional food ingredients (especially $\beta$-lactoglobulin).

We turn now to the second embodiment herein, that is the embodiment of the invention directed to a process for making Mozzarella cheese, comprising the steps of: (a) preparing an admixture of the retentate of the first embodiment herein and milkfat to obtain a protein to fat ratio within 15%, typically within 5 to 15%, of that for the final cheese; (b) forming a homogeneous cheesemilk from the admixture; (c) adding acidulant and/or starter culture to achieve suitable and typical acidity in the final cheese being made (pH ranging from 5.0 to 5.7); (d) adding rennet to cause formation of a coagulum; (e) cutting the coagulum after suitable hydrolysis of casein to parakappacasein and heating and draining whey if drainable whey is present, to produce cheese curd of 44 to 56% moisture content; and (f) forming the cheese curd into the final cheese.

We turn now to step (a), i.e., preparing an admixture of the retentate of the first embodiment herein and milkfat to obtain a protein: fat ratio within 15% of that for the final cheese. This is preferably carried out by adding the milkfat to the retentate by mixing. The protein:fat ratio preferably ranges from 0.9 to 3.2 and in Example I herein a protein to fat ratio of 0.94 (casein to fat ratio of 0.84) produced good results.

The milkfat preferably is butteroil or cream including plastic cream (a high fat cream of 50 to 65% milkfat by weight).

We turn now to step (b), i.e., the step of forming homogeneous cheesemilk from the admixture formed in step (a). This step preferably includes heating the admixture of step (a) to 45 to 55° C. (52° C. was used in Example II hereinafter) to provide a viscosity which is compatible with forming of homogeneous cheesemilk. With heavy or plastic creams, a homogeneous mixture can be formed by heating the milkfat and simple mixing; whereas with butteroil, a homogeneous mixture can be formed by heating the milkfat, mixing with retentate and producing a homogeneous mixture by homogenizing the admixture of step (a), e.g., with a homogenizer apparatus, using a homogenizing pressure ranging, for example, from 3.4 to 13.8 MPa (6.9 MPa was used in Example II hereinafter). Total protein, casein and fat are increased in the retentate-based cheesemilk compared to the composition of normal cheesemilk (cheesemilk utilized in conventional cheese making).

When heavy cream is the milkfat, steps (a) and (b) would not be absolutely distinct and may be done at the same time. For example, the cream can be added to the tank of retentate which would be mixing and stirring would be continued for some time to obtain a homogeneous cheesemilk. Thus, in all cases, steps (a) and (b) can be described together as forming a homogeneous admixture of retentate and milkfat in a protein to fat ratio within 15% of that in the final cheese.

We turn now to step (c), i.e., the step of adding acidulant and/or starter culture to achieve suitable and typical acidity in the finished cheese being made. Suitable acidulants include, for example, lactic acid, citric acid and glucono-delta-lactone (GDL). Preferably, the suitable acidity is obtained by addition of glucono-delta-lactone and/or starter culture. The acidity suitable for the final cheese is that present after the normal manufacturing process and can range, for example, from 5.0 to 5.7. The preferred pH in low-moisture, part skim (LMPS) Mozzarella is about 5.3.

When glucono-delta-lactone is used to adjust the cheesemilk pH, it has been found that addition of it to the cheesemilk at 1.7% w/w just prior to rennet addition in step (d) provided a final cheese pH of about 5.3 which remains constant throughout aging. The addition of glucono-delta-lactone (GDL) allowed the coagulum pH to decrease to 5.5 to 5.8 at the time of cutting (step (e)) and a curd pH typically ranging from 5.3 to 5.4 after whey draining.

We turn now to use of starter culture to obtain proper acidity development. It was found that using 1.3 weight percent direct-to-vat starter culture for acidity development in cheesemilk from retentates concentrated to a concentration factor of 8×–9× instead of GDL provided a pH of 5.10 in the cheese obtained in step (f) which rose to 5.20 at day 60 after step (f). When starter culture was used instead of GDL, the resulting cheese showed increased levels of 12% of trichloroacetic acid soluble N levels with aging whereas when GDL was used rather than starter culture, such increase was not noted during cheese aging. When starter culture is used instead of GDL, 10–15 minutes longer heating time is typically required in step (e). Starter cultures are known in the art; starter culture used in Example II hereinafter consisted of a 1:1 ratio of *Streptococcus* ssp. *thermophillus* and *Lactobacillus delbruekii* ssp. *bulgaricus*.

The use of a combination of GDL and starter culture to obtain acidity rather than either alone has the advantage of being able to rapidly lower the pH of the retentate/cheesemilk while the added starter culture bacteria will eventually lyse and release proteolytic enzymes that contribute to typical ripening patterns found in Mozzarella and other varieties of cheese. In such case for cheesemilk from retentate concentrated to 8× to 9×, use of, for example, 1% GDL by weight of cheesemilk in combination with, for example, 0.6% direct-to-vat starter culture by weight of cheesemilk is considered to provide a balance between necessary acid development and rheological development in the cheese product during the normal ageing period.

We turn now to step (d), i.e., the step of adding rennet to cause formation of a coagulum. Preferably, this step is carried out at a temperature ranging from 30 to 40° C., preferably at a temperature ranging from 32 to 36° C. (coagulation temperature), using rennet in an amount ranging from 40 to 140 $\mu$l single strength rennet per kg cheesemilk, preferably from 80 to 100 $\mu$l single strength rennet per kg cheesemilk (in Example II herein, this amount of rennet provided proteolysis equivalent to that of commercial low-moisture part-skim Mozzarella cheese). The rennet is preferably added to the cheesemilk diluted, e.g., 1:100, with deionized water, and the diluted rennet is preferably added at the coagulation temperature.

Coagulation time is defined herein to mean the time where a clean knife slit can be made in the coagulum. For rennet addition rates of 80 $\mu$l rennet per kg of cheesemilk from retentate of concentration factor 8×–9×, coagulation times ranged from 11 to 16 minutes.

We turn now to step (e), i.e., the step of cutting the coagulum after hydrolysis of, for example, at least 80% of the casein therein to parakappacasein, and heating to achieve proper moisture content and develop suitable acidity in the curd obtained and draining whey if drainable whey is present to produce cheese curd of 44 to 56% moisture content.

The hydrolysis of at least 80% of casein to parakappacasein is achieved on maintaining the coagulum without cutting, for example, from 5 to 25 minutes, preferably 10 to 15 minutes as determined in experimentation on cheese making from the retentate of Example I hereinafter.

Cutting is carried out in order to allow expulsion of any drainable whey, to allow even heating of the curd to promote optional growth conditions for starter culture, and to attain typical mineral content in the cheese. Cutting the curd preferably involves obtaining, for example, 2 cm cubes.

After cutting, the obtained curd is preferably allowed to heal for 3 to 8 minutes, e.g., 5 minutes, and then is heated at 35 to 45° C., e.g., 42° C., for 0.5 to 2.0 hours, e.g., 1.25 hours Example II herein when glucono-delta-lactone is used and 10–15 minutes longer when starter culture is used, to cause acidity development and to achieve proper moisture content, whereupon any drainable whey is drained. With retentate of higher concentration factor (10×–12×) as stalling material, little, if any, drainable whey is present. With retentate of concentration factor 7× to 9× as the starting material, the amount of drainable whey is small, approximately 15 to 20% by weight of the cheesemilk mixture. The characteristic of very little or no whey drainage allows for cheese manufacturing equipment that is smaller in size than that conventionally used, for a given cheese output.

We turn now to step (f), i.e., the step of forming the cheese curd from step (e) into the final cheese. Salting, heating and stretching of the curd can be done in a manner typical for Mozzarella cheese manufacture, which may include heating the cheese curd (e.g., in 60 to 80° C. water, preferably 70° C. water) with stretching done by hand or with the use of appropriate machinery and processes well-known in the art, for example, with hand stretching, 1 to 4 minutes of heating, preferably 2 minutes, with the cheese reaching an internal temperature of 50 to 65° C. during stretching, preferably 56 to 57° C. The hot, plasticized curd is placed in molding forms for partial cooling, e.g., in plastic or metal forms, and then may be cooled further on ice and afterwards is salt brined, e.g., by soaking in saturated brine for 1 to 6 hours, preferably for 2 hours at the pH desired in the final cheese, preferably 5.3. The salt brine is preferably maintained at 2 to 10° C.

As an alternative to heating and stretching, the drained cheese curd can be dry salted and put into forming containers or other appropriate forming machinery well-known in the art and placed under pressure to allow the curd to knit together and form blocks of cheese.

We turn now to the third embodiment of the invention herein which is directed to a composition obtained from skim milk where the composition contains whey protein in amount of 40% to 80% of that of the skim milk where the whey protein has a denaturation enthalpy of at least 12.00 ΔH (J/g), and where the composition is sterile of microorganisms and contains less than 0.20% by weight fat on a dry basis and no measurable casein and no glycomacropeptides, rennet or starter culture and where any lactose in the composition is optionally hydrolyzed. This composition may be described as virgin whey protein.

Preferably, the composition of the third embodiment is obtained from high temperature, short time pasteurized skim milk and contains only components that are able to pass through a microfiltration membrane having a pore size ranging from 0.05 μm to 0.2 μm and is free of flavor associated with whey obtained incident to commercial cheese production.

The whey protein amount is determined by determining total nitrogen and non-protein nitrogen (NPN) by method as described in AOACI Official Methods of Analysis, 16$^{th}$ edition 1995, Assoc. Official Analytical Chemists Int., Arlington, Va., by macro-Kjeldahl to determine protein nitrogen by difference and determining casein nitrogen by the method of IDF Standard No. 29, 1964, Int. Dairy Fed., Brussels, Belgium and determining whey protein nitrogen by difference, and then determining whey protein amount from the whey protein nitrogen.

The denaturation enthalpy of whey protein is determined using a TA instrument differential scanning calorimeter according to the procedure of Patel, M. T., et al, Journal of Dairy Science 73, 1439–1449 (1991).

The fat content is preferably no measurable fat as measured by Mojonier ether extraction by method described in AOACI Official Methods of Analysis, 16$^{th}$ edition, 1995, Assoc. Official Analytical Chemists Int., Arlington, Va., and fat content less than 0.20% is determined by IDF Standard Method IC:1987.

Determination of no measurable casein is carried out by measuring for casein nitrogen as set forth above.

There are no glycomacropeptides, rennet or starter culture because the composition is obtained not as a by-product of cheesemaking or with addition of starter culture.

The composition of the third embodiment preferably constitutes permeate obtained in the process of the first embodiment comprising subjecting skim milk to microfiltration and pH reduction during the microfiltration where the microfiltration comprises concentration in a microfiltration system to a concentration factor of 7× to 12× compared to the skim milk and where the pH reduction comprises adding acidulant which is not starter culture to the skim milk being processed during the concentrating to obtain pH reduction to pH ranging from 5.8 to 6.4. Composition of the third embodiment obtained in this way has a total protein content on dry basis ranging from 9 to 12%, a whey protein content on a dry basis ranging from 6 to 8%, a lactose content on a dry basis ranging from 80 to 85% and a calcium content on a dry basis ranging from 0.40 to 0.70%. In one alternative, the lactose may be hydrolyzed either enzymatically, e.g., with lactase or by other means.

We turn now to the fourth embodiment of the invention herein which is directed at a fruit beverage comprising by weight 10 to 30% fruit juice concentrate, 5 to 8% sugar and 62 to 85% of the composition of the third embodiment having a pH ranging from 3.5 to 4.3.

The fruit juice concentrate can be, for example, orange juice concentrate, grape juice concentrate, apple juice concentrate, grapefruit juice concentrate, tangerine juice concentrate, cranberry juice concentrate, mango juice concentrate, kiwi juice concentrate, pomegranate juice concentrate or other similar juice concentrates, and mixtures of these juice concentrates.

A fruit beverage based on orange juice concentrate comprises by weight 10 to 25% orange juice concentrate, 5 to 8% sugar and 67 to 85% of the composition of the third embodiment and has a pH ranging from 3.5 to 4.3.

A fruit beverage based on grape juice concentrate comprises by weight 15 to 25% grape juice concentrate, 5 to 7% sugar and 68 to 80% of the composition of the third embodiment and has a pH ranging from 3.2 to 4.0.

A fruit beverage based on apple juice concentrate comprises by weight 15 to 30% apple juice concentrate, 5 to 7% sugar and 63 to 80% of the composition of the third embodiment and has a pH ranging from 3.6 to 4.2.

The fruit beverage of the fourth embodiment is preferably made by adjusting the pH of the composition of the third embodiment using glucono-delta-lactose or similar acidulant, to the pH range for the beverage, adding the sugar and fruit juice concentrate, pasteurizing at 93° C. for 30 seconds and cooling to refrigerator temperature. Processing in this way, provides a product, without whey protein precipitation.

As indicated above, this application is a continuation-in-part of U.S. application Ser. No. 09/593,770, which claims the benefit of U.S. Provisional Application No. 60/145,271. The whole of said Application No. 60/145,271, including the 19 pages referred to as specification and the 8 sheets referred to as drawings, and Appendixes A and B thereof, is incorporated herein by reference.

The invention herein is illustrated by the following working examples.

EXAMPLE I

Microfiltration of Skim Milk to Provide a Retentate Concentrated to a Concentration Factor of 8×–9× and Permeate A schematic diagram of a microfiltration membrane system incorporating a uniform transmembrane pressure loop (UTMP), used for the experiments of this Example is depicted in FIG. 1.

The system used was a batch concentration microfiltration system with UTMP capability and was equipped with two alumina-based ceramic membranes (0.2 μm nominal pore diameter, 0.4 m² total surface area (Membralox® P19-40, U.S. Filter Corp., Warrendale, Pa.)) and flow meters (Series 55-200, Wallace & Tiernan, Belleville, N.J.) that were placed upstream from each membrane. Operating dead volume for the system was 16 liters for retentate and 12 liters for permeate.

For the experiments of this example, the system was operated utilizing the uniform transmembrane pressure loop. Skim milk retentate was circulated through the system by a 7.5 HP centrifugal feed pump (Reliance Electric Co., Minneapolis, Minn.) (shown in FIG. 1 directly downstream of the feed tank) until reaching the desired concentration factor with retentate temperature maintained by a shell and tube heat exchanger. A 2 HP centrifugal pump (Gould Century, St. Louis, Mo.) (shown in a loop with the annulus between each membrane and the heat exchanger shell in FIG. 1) was used to circulate permeate co-currently to retentate flow. Said annulus was packed with plastic beads (U.S. Filter Corp., Warrendale, Pa.). Pressures on inlet and outlet permeate ports were controlled by butterfly valves placed prior to and after the permeate pump (as shown in FIG. 1). Permeate was collected as overflow from an elevated tank.

In each experiment, two hundred kilograms of high-temperature, short-time (HTST) pasteurized skim milk was obtained from the Cornell University dairy plant, heated to 50° C. and put into the preheated microfiltration system that was maintained at 50° C. (±2° C.). Retentate and permeate inlet pressures were set to 448 and 186 kPa, respectively, retentate and permeate outlet pressures were set at 310 and 48 kPa, respectively, for a constant inlet-outlet ΔP of 138 kPa and transmembrane pressure of 262 kPa. Towards the end of concentration, the retentate outlet pressure slowly declined and widened ΔP, so permeate outlet pressure was concurrently decreased. Retentate flow velocity was maintained at 7.5 m/s.

Glucono-delta-lactone (GDL) (Glucona America, Janesville, Wis.) was used for retentate acidification. Gradual acidification of retentate during microfiltration was carried out by dissolving GDL in 4° C. skim milk feed and adding the resulting GDL-containing solution into the feed tank of the system depicted in FIG. 1. One-half the desired pH reduction was effected between the start of the process and concentration factor (CF) 2, with the remaining pH reduction occurring up to CF 6. The skim milk feed without GDL added thereto, had a pH of 6.6. Approximately 1.0 g and 1.6 g GDL per liter skim milk were required for the retentate to reach pH 6.3 and pH 6.0 respectively.

Retentate was concentrated to CF 8 to 9 with nine process replications, two at pH 6.6 (no GDL addition), two at pH 6.3 (GDL addition), and five at pH 6.0 (GDL addition). Retentate was collected at the end of filtration and frozen at −40° C., along with samples of retentate and permeate for analysis.

Compositions were compared against pH level by analysis of variance with Fishers' least significant difference test of means at a significance level of P=0.05. Statistical analysis was performed using Minitab 11 for Windows (Minitab, Inc., State College, Pa.).

Skim milk was microfiltered until reaching CF 8 to 9 at pH levels of 6.6, 6.3 and 6.0. The use of GDL was effective in achieving desired retentate pH levels in a controlled manner without inducing localized coagulation. Retentates had no off-flavors or odors during or after the filtration process.

The mean composition of skim milk and of retentate and permeate at each level are set forth in Table 1 below:

TABLE 1

| Component | Skim milk[2] | Final retentate[1] | | | Composite permeate[1] | | |
|---|---|---|---|---|---|---|---|
| (weight %) | 6.6 | 6.6 | 6.3 | 6.0 | 6.6 | 6.3 | 6.0 |
| Total solids | 8.91 | 27.72 | 28.86 | 27.29 | 5.90 | 5.82 | 6.04 |
| Fat | 0.05 | 0.41 | 0.41 | 0.39 | 0.0 | 0.0 | 0.0 |
| Ash | 0.69 | 2.39 | 2.39 | 2.17 | 0.40 | 0.41 | 0.45 |
| Calcium | 0.11 | 0.78 | 0.69 | 0.53 | 0.028 | 0.036 | 0.047 |
| Lactose | 5.02 | 4.70 | 4.98 | 4.93 | 4.91 | 4.84 | 5.01 |
| Total protein[3] | 3.13 | 20.22 | 21.08 | 19.80 | 0.59 | 0.57 | 0.57 |
| True protein[3] | 3.01 | 20.13 | 20.97 | 19.73 | 0.41 | 0.39 | 0.39 |
| Casein[3] | 2.39 | 18.14 | 18.76 | 17.52 | 0.0 | 0.0 | 0.0 |
| Whey protein[3] | 0.61 | 1.99 | 2.21 | 2.21 | 0.41 | 0.39 | 0.39 |
| Calcium to total protein ratio | 3.59 | 3.85 | 3.28 | 2.52 | ... | ... | ... |
| Calcium to casein ratio | 4.71 | 4.29 | 3.69 | 3.04 | ... | ... | ... |

[1]Mean values of components from microfiltration done at three pH levels (n = 2 at pH 6.6, n = 2 at pH 6.3, and n = 5 at pH 6.0).
[2]Mean composition (n = 9).
[3]Computed as (N × 6.38).

As shown in Table 1, as compared to normal skim milk, concentrations of all retentate components increased except for lactose. Ratio of casein to true protein (total protein minus non-protein nitrogenous compounds) increased. Retentates were not fully depleted of whey protein by the end of the concentration and whey protein in the retentates amounted to 9 to 11% of the true protein content of the retentate. As shown in Table 1, retentate calcium to total protein ratios and retentate calcium to casein ratios both decreased with lower pH.

As shown in Table 1, the microfiltration permeate composition was similar to cheese whey in several aspects such as lactose, total protein and ash content, but differed in not containing measurable fat or casein. It also did not contain glycomacropeptide.

The mean dry basis composition of skim milk and the retentates and permeates at each pH is shown in Tables 2A and 2B below:

TABLE 2A

| Component | Skim milk[2] | Final retentate[1] | | | | | |
|---|---|---|---|---|---|---|---|
| (weight %) | pH 6.6 | pH 6.6 | SEM | pH 6.3 | SEM | pH 6.0 | SEM |
| Fat | 0.60 | 1.48[A] | 0.09 | 1.43[A] | 0.09 | 1.41[A] | 0.05 |
| Ash | 7.79 | 8.63[A] | 0.16 | 8.35[B] | 0.16 | 7.92[C] | 0.10 |
| Calcium | 1.26 | 2.80[A] | 0.12 | 2.40[B] | 0.12 | 1.94[C] | 0.07 |
| Lactose | 56.43 | 17.06[A] | 0.91 | 17.36[A] | 0.91 | 18.07[A] | 0.58 |
| Total protein[3] | 35.26 | 72.81[A] | 0.92 | 73.02[A] | 0.92 | 72.54[A] | 0.58 |
| True protein[3] | 33.50 | 72.54[A] | 0.82 | 72.72[A] | 0.82 | 72.27[A] | 0.49 |
| Casein[3] | 26.60 | 65.40[A] | 0.84 | 64.88[A] | 0.84 | 64.16[A] | 0.48 |
| Whey Protein[3] | 6.88 | 7.17[A] | 0.16 | 7.66[B] | 0.16 | 8.10[C] | 0.09 |
| Casein:true protein ratio | 79.48 | 90.12[A] | 0.27 | 89.43[AB] | 0.27 | 88.79[B] | 0.19 |

TABLE 2B

| Component (weight %) | Composite permeate[1] | | | | | |
|---|---|---|---|---|---|---|
| | pH6.6 | SEM | pH 6.3 | SEM | pH 6.0 | SEM |
| Fat | 0.0 | ... | 0.0 | ... | 0.0 | ... |
| Ash | 6.74[A] | 0.09 | 6.97[B] | 0.09 | 7.47[C] | 0.06 |
| Calcium | 0.48[A] | 0.03 | 0.62[B] | 0.03 | 0.78[C] | 0.02 |
| Lactose | 83.35[A] | 0.37 | 83.21[A] | 0.37 | 82.90[A] | 0.23 |
| Total protein[3] | 10.01[A] | 0.07 | 9.76[B] | 0.07 | 9.52[C] | 0.04 |
| True protein[3] | 7.02[A] | 0.09 | 6.69[B] | 0.09 | 6.46[C] | 0.05 |
| Casein[3] | 0.0 | ... | 0.0 | ... | 0.0 | ... |
| Whey Protein[3] | 7.02[A] | 0.09 | 6.69[B] | 0.09 | 6.46[C] | 0.05 |
| Casein:true protein ratio | ... | ... | ... | ... | ... | ... |

[1]Mean values of components from microfiltration done at three pH levels (n = 2 at pH 6.6, n = 2 at pH 6.3, and n = 5 at pH 6.0).
[2]Mean composition (n = 9).
[3]Computed as (N × 6.38).
[A,B,C]Means that differ across rows (within categories) are indicated by unlike superscripts (P < 0.05).

The weight percentage transfers of individual skim milk components into permeate at each pH level are shown in Table 3 below:

TABLE 3

| Component | Percent transfer into permeate[1] | | | | | |
|---|---|---|---|---|---|---|
| | pH 6.6 | SEM | pH 6.3 | SEM | pH 6.0 | SEM |
| Total weight | 87.70[A] | 0.83 | 87.30[A] | 0.83 | 86.84[A] | 0.52 |
| Total solids | 58.35[A] | 0.95 | 57.50[A] | 0.95 | 58.72[A] | 0.60 |
| Ash | 49.15[A] | 1.49 | 52.85[AB] | 1.49 | 56.40[B] | 0.94 |
| Calcium | 21.90[A] | 0.60 | 28.05[B] | 0.60 | 37.62[C] | 0.38 |
| Lactose | 86.40[A] | 1.52 | 85.15[A] | 1.52 | 86.16[A] | 0.96 |
| Total protein[2] | 16.60[A] | 0.25 | 16.00[AB] | 0.25 | 15.84[B] | 0.16 |
| True protein[2] | 12.25[A] | 0.27 | 11.55[B] | 0.27 | 11.32[B] | 0.16 |
| Whey protein[2] | 59.55[A] | 1.00 | 56.75[AB] | 1.00 | 54.40[B] | 0.63 |

[1]n = 2 at pH 6.6, n = 2 at pH 6.3, and n = 5 at pH 6.0.
[2]Computed as (N × 6.38).
[A,B,C]Means that differ across rows are indicated by unlike superscripts (P < 0.05).

Figure 2:
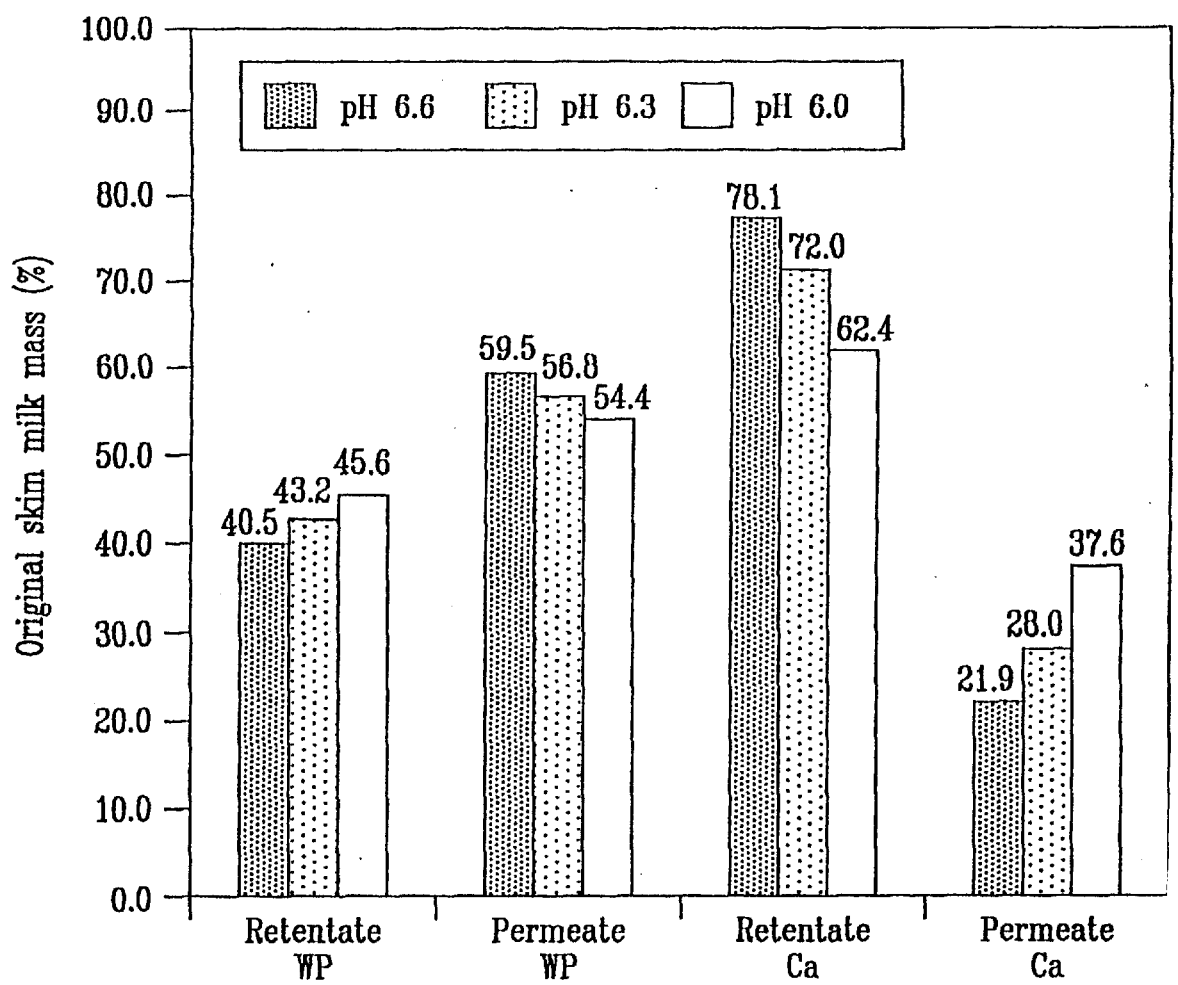
FIG. 2 is a graph of mean percentage of original mass of skim milk Ca and whey proteins (WP) in retentate and permeate as a function of microfiltration pH and shows results of Example I hereinafter.

Changes in calcium and whey protein content are shown in FIG. 2 where the order of the bars for each category is pH 6.6, pH 6.3 and pH 6.0. As shown in FIG. 2 retentate calcium content decreased by 20.1% from pH 6.6 to pH 6.0 whereas retentate whey protein content increased by 12.6%, demonstrating that low pH microfiltration can be used effectively to change retentate mineral balance while maintaining 87.4% of nominal whey protein permeation (at retentate pH 6.6).

The whey protein in the permeate has a denaturation enthalpy of at least 12.00 ΔH (J/g).

The permeate constitutes a composition obtained from skim milk where the composition contains whey protein in an amount of 40 to 80% of that of the skim milk where the whey protein has a denaturation enthalpy of at least 12.00 ΔH (J/g), and where the composition is sterile of microorganisms and contains less than 0.20% fat by weight on a dry basis and no measurable casein and no glycomacropeptides, rennet or starter culture.

The results show that microfiltration of acidified skim milk can be used to produce a very suitable, concentrated retentate, for use in cheese manufacture, concurrently with production of a permeate suitable for recovery, concentration, or isolation of whey protein or individual whey protein species, and that of the runs carried out, the most suitable for this purpose was CF 8 to 9, pH 6.0 microfiltration.

EXAMPLE II

Preparation of Mozzarella Cheese 3,500 g of retentate produced as in Example I at 50° C. was standardized with liquid butteroil to a protein to fat ratio of 0.94 (casein to fat ratio of 0.84) and homogenized at 6.9 MPa to produce homogenous cheesemilk.

To 4217 g of homogenous cheesemilk was added 71.7 g glucono-delta-lactone (1.7% w/w).

Directly after the glucono-delta-lactone addition, rennet diluted 1:100 with deionized water was added to the acidified cheesemilk at 36° C. in an amount of 80 μl single strength rennet per kg cheesemilk. A coagulum was typically formed in 15 minutes.

The coagulum was maintained at 36° C. for 15 minutes to allow for hydrolysis of casein to parakappacasein.

After coagulation, the curd was cut into 2 cm cubes, then the cubes were allowed to heal for 5 minutes and then were heated at 42° C. for 75 minutes, whereupon whey was drained.

Then a 450 gram batch of the curd was heated in 70° C. water for 2 minutes and hand-stretched, reaching an internal cheese temperature of 56 to 57° C. during stretching. Resulting cheese was placed in plastic forms and rapidly cooled to 10° C. by placing the filled forms on ice. The cooled cheeses were then removed from the forms and brine-salted (saturated brine, 2 hours, 10° C., pH 5.3) and vacuum packed in barrier bags for storage at 4° C.

The resulting cheese had a moisture content of 50.3% by weight and the preparation provided low-moisture part skim Mozzarella cheese, hereinafter MFM.

In another case, cheese manufacture was carried out as above, except that starter culture was used in place of glucono-delta-lactone and heating after cutting was 90 minutes instead of 75 minutes. The starter culture used was a 1:1 ratio of *Streptococcus* ssp. *thermophillus* and *Lactobacillus delbruekii* ssp. *bulgaricus* (C120 and R160, Rhone-Poulenc, Madison, Wis.). The amount of starter culture used was 1.3 weight percent based on the cheesemilk. The preparation provided low-moisture part-skim Mozzarella cheese, hereinafter MFM-S.

Commercial low-moisture part-skim Mozzarella cheese (hereinafter CM) was obtained for comparison purposes.

The MFM and MFM-S cheeses produced met the U.S. standard of identity for low-moisture part-skim (LMPS) Mozzarella cheese and were within the compositional range for commercial products.

For MFM, a yield increase of 14.9% was realized over normal CM manufacture as a result of whey protein incorporation in the cheese (1.6% by weight of cheese), increased lactose retention (less whey drainage), and low fat losses to whey.

MFM-S composition was substantially similar to that of MFM, but with slightly higher total solids, fat and protein due to a slightly longer heating time.

Mean MFM Ca content was 0.69 weight percent, which is close to the literature value of 0.70 to 0.85 weight percent for LMPS Mozzarella cheese. Mean ratios of Ca:casein and Ca:protein were within the range of literature values for LMPS Mozzarella. A major compositional difference was that whey protein constituted 7.8% of MFM total protein which is 1.60% whey protein as a percentage of cheese weight, which is a significant quantity but much less than in an equivalent ultrafiltration cheese. The fat-in-dry matter of MFM was near the upper legal limit. Salt content of MFM was within normal range of composition.

Compared to day 1 observations, MFM cheese exhibited a smoothening of gross structure between day 7 and day 30. Informal tasting revealed a very clean, bland flavor with overtones of diacetyl from butteroil, but no rancidity or bitterness was observed up to 100 days. The MFM cheese was markedly whiter than CM, both before and after pizza baking.

Mean MFM pH was 5.3 and remained constant throughout aging, while pH of MFM-S rose from 5.10 to 5.20 at 60 days.

Initial mean standard plate count (number of live bacteria per gram in the cheese) was between 3,000 and 4,000 CFU/g for all cheese types and did not change substantially with age. Bacteria present in all cheeses had lactic-type colony morphology.

As compared to conventional cheese making processes, 93% less rennet was required to coagulate the microfiltration retentate-based cheesemilk while allowing attainment of a typical pattern of proteolysis as that found in CM cheese, which was typical of LMPS Mozzarella cheese.

EXAMPLE III

A fruit beverage was made up starting with permeate (pH 6.0) from Example I. The pH of the permeate was adjusted to 3.8 with glucono-delta-lactone. Then sugar and orange juice concentrate were added to provide a composition containing by weight 20% orange juice concentrate, 6% sugar and 74% permeate. Pasteurization was then carried out at 93° C. for 30 seconds, followed by cooling to refrigerator temperature. The beverage showed higher sensory rating than control orange juice.

EXAMPLE IV

A fruit beverage was made up starting with permeate (pH 6.0) from Example I. The pH of the permeate was adjusted to 3.5 with glucono-delta-lactone. Then sugar and grape juice concentrate were added to provide a composition containing by weight 15% grape juice concentrate, 7% sugar and 78% permeate. Pasteurization was then carried out at 93° C. for 30 seconds, followed by cooling to refrigerator temperature. The beverage showed less sensory rating than control grape juice.

EXAMPLE V

A fruit beverage was made up starting with permeate (pH 6.0) from Example I. The pH of the permeate was adjusted to 3.9 with glucono-delta-lactone. Then sugar and apple juice concentrate were added to provide a composition containing by weight 17.5% apple juice concentrate, 7% sugar and 75.5% permeate. Pasteurization was then carried out at 93° C. for 30 seconds, followed by cooling to refrigerator temperature. The beverage had comparable flavor score to control apple juice.

VARIATIONS

Variations will be obvious to those skilled in the art. Thus the scope of the invention is defined by the claims.

What is claimed is:

1. Composition obtained from skim milk, said composition containing whey protein in an amount of 40 to 80% of that of the skim milk, said whey protein having a denaturation enthalpy $\Delta H$ (J/g) of at least 12.00, said composition being sterile of microorganisms and containing less than 0.20% by weight fat on a dry basis, no measurable casein and no glycomacropeptides, rennet or starter culture and where any lactose is optionally hydrolyzed.

2. The composition of claim 1 where the skim milk is high temperature, short time pasteurized skim milk.

3. The composition of claim 1 which is free of flavor associated with whey obtained incident to commercial cheese production.

4. The composition of claim 1 which contains only components that are able to pass through a microfiltration membrane having pore size ranging from 0.05 $\mu$m to 0.2 $\mu$m.

5. The composition of claim 1 where the composition constitutes permeate obtained in a process comprising subjecting the skim milk to microfiltration and pH reduction during the microfiltration, said microfiltration comprising concentration in a microfiltration system to a concentration factor of 7× to 12× compared to the skim milk, said pH reduction comprising adding acidulent to the skim milk being processed during the concentrating to obtain pH reduction to pH ranging from 5.8 to 6.4

6. Fruit beverage comprising by weight 10 to 30% fruit juice concentrate, 5 to 8% sugar and 62 to 85% of the composition of claim 1, having a pH ranging from 3.5 to 4.3.

7. A fruit beverage comprising 10 to 25% orange juice concentrate, 5 to 8% sugar and 67 to 85% of the composition of claim 1, having a pH ranging from 3.5 to 4.3.

8. A fruit beverage comprising 15 to 25% grape juice concentrate, 5 to 7% sugar and 68 to 80% of the composition of claim 1, having a pH ranging from 3.2 to 4.0.

9. A fruit beverage comprising 15 to 30% apple juice concentrate, 5 to 7% sugar and 63 to 80% of the composition of claim 1, having a pH ranging from 3.6 to 4.2.

10. Composition obtained from skim milk, said composition containing whey protein in an amount of 40 to 80% of that of the skim milk, said composition being sterile of microorganisms and containing less than 0.20% by weight fat on a dry basis, no measurable casein and no glycomacropeptides, rennet or starter culture and where any lactose is optionally hydrolyzed.

* * * * *